US009021923B2

(12) United States Patent
Tatich

(10) Patent No.: US 9,021,923 B2
(45) Date of Patent: May 5, 2015

(54) TORQUE WRENCH ADAPTOR TOOL ASSEMBLY AND METHODS OF OPERATING THE SAME

(71) Applicant: Unison Industries, LLC, Jacksonville, FL (US)

(72) Inventor: Alan John Tatich, Endicott, NY (US)

(73) Assignee: Unison Industries, LLC, Jacksonville, FL (US)

( * ) Notice: Subject to any disclaimer, the term of this patent is extended or adjusted under 35 U.S.C. 154(b) by 295 days.

(21) Appl. No.: 13/658,224

(22) Filed: Oct. 23, 2012

(65) Prior Publication Data

US 2014/0109376 A1 Apr. 24, 2014

(51) Int. Cl.

| | |
|---|---|
| ***H01R 43/26*** | (2006.01) |
| ***B23P 11/00*** | (2006.01) |
| ***B25B 13/52*** | (2006.01) |
| ***B25B 13/50*** | (2006.01) |

(52) U.S. Cl.

CPC ....... *B25B 13/5016* (2013.01); *Y10T 29/49881* (2015.01); *H01R 43/26* (2013.01)

(58) Field of Classification Search

CPC ...................................................... B25B 13/481
USPC ................. 81/90.3–90.8, 65.2, 426.5; 29/456
See application file for complete search history.

(56) References Cited

U.S. PATENT DOCUMENTS

| | | | | |
|---|---|---|---|---|
| 871,436 A * | 11/1907 | Parmelee | | 81/90.5 |
| 1,547,543 A * | 7/1925 | Welty | | 81/90.5 |
| 1,713,694 A * | 5/1929 | Elliott | | 81/472 |
| 1,864,389 A * | 6/1932 | Wilson | | 81/57.15 |
| 3,885,479 A * | 5/1975 | Ono | | 81/90.5 |
| 3,962,936 A | 6/1976 | Lewis | | |
| 4,928,558 A * | 5/1990 | Makhlouf | | 81/57.3 |
| 4,945,791 A | 8/1990 | Herschler et al. | | |
| 4,987,804 A | 1/1991 | Greenawalt | | |
| 5,320,021 A | 6/1994 | Heintz | | |
| 5,598,752 A | 2/1997 | Daniels et al. | | |
| 6,227,076 B1 * | 5/2001 | Murray | | 81/58.2 |
| 6,978,701 B1 * | 12/2005 | Buchanan | | 81/98 |
| 7,721,628 B2 * | 5/2010 | Lorger et al. | | 81/90.3 |
| 8,561,504 B2 * | 10/2013 | Buchanan | | 81/124.3 |
| 2006/0070498 A1 * | 4/2006 | Buchanan | | 81/90.1 |
| 2006/0236816 A1 * | 10/2006 | Picou | | 81/57.14 |
| 2009/0000428 A1 * | 1/2009 | Flores et al. | | 81/60 |
| 2011/0132151 A1 * | 6/2011 | Buchanan | | 81/124.2 |
| 2012/0031241 A1 * | 2/2012 | Mueller | | 81/90.2 |

* cited by examiner

*Primary Examiner* — David B Thomas
(74) *Attorney, Agent, or Firm* — William S. Munnerlyn; General Electric Company

(57) ABSTRACT

An adaptor tool comprises a locking pin removably engaged with a main body defining a hook portion. The main body is configured to pivot about a pivot pin. The adaptor tool further includes a first link having first and second ends, and a first contact face. The first link is configured to receive the locking pin. A second link includes first and second ends, and a second contact face. The second link is pivotally coupled to the main body via the pivot pin. At least a third link includes first and second ends, and a third contact face. The first, second, and at least third links are pivotally coupled end-to-end such that the first, second, and third contact faces define a circular opening. The circular opening is configured to receive a workpiece such that rotational force applied to the main body rotates the adaptor tool and the workpiece.

17 Claims, 9 Drawing Sheets

TORQUE WRENCH ADAPTOR TOOL ASSEMBLY AND METHODS OF OPERATING THE SAME

BACKGROUND

The embodiments described herein relate generally to tightening a threaded connector and, more specifically, to applying a specified torque setting to the backshell of electrical connectors installed in functional systems.

Electrical connectors used in aircraft and various types of military vehicles are generally environmentally sealed to prevent moisture incursion. Generally, the connectors may be multi-pin connectors in which the pins are releasably held in place in the connectors. An elastomer material may fill the connector around at least a portion of the pins and the electrical wiring connected to the pins. The pins may be soldered or crimped to an electrical wire or cable and may be inserted into the connector from a rear side of the connector by pushing the pins through preformed holes in the elastomer insert in the connector. Known connectors may include an outer metal housing with a keyed front section for mating engagement with another connector. A locking ring may couple the two mating connectors to each other. A back part of the housing is threaded for receiving a backshell. The backshell may include an extension for fastening about the wires exiting the rear of the connector for strain relief.

Backshells are used in electrical connectors to compress the elastomer insert in the connector and secure the pins connected to wires extending from the body to their functional terminals. All such conductors pass through the connector backshell which mates with the threaded housing of the connector to compress the connector's elastomer insert around its pins. Accurate torque application is necessary to preclude under or over compression of the connector filler with consequences of loss of electrical contact at its pins or sockets, or distortion of the same through over tightening.

Known means for tightening the backshell include the use of a strap wrench. However, the use of a strap wrench may result in a number of undesirable results. Once the strap is tightened around a backshell, the strap of at least some known strap wrenches may slip and cause the backshell not to be tightened. Because backshells are often located in areas where access to the backshell is restricted by other components, slippage of the strap may cause a user to injure themselves by striking a fixture adjacent to the backshell Also, the strap may fail and break, which may also cause an injury to the user. Furthermore, known strap wrenches may provide inaccurate torque readings if not used in combination with an adapter that is manipulated by a torque wrench to obtain a precise torque setting. It may be difficult for a single person to operate the strap wrench, the adapter, and the torque wrench to achieve the desired torque setting.

Accordingly, there is a need for a tool that tightens backshell connectors without risk of slippage or failure and that may be easily operable by a single person.

BRIEF DESCRIPTION

In one aspect, an adaptor tool for engaging a threaded workpiece is provided. The adaptor tool comprises a locking pin and a main body portion defining a hook portion and an aperture. The main body portion is configured to pivot about a first pivot pin, and the aperture is configured to receive a torque tool. The adaptor tool further includes a first link having a first end, an opposing second end, and a first arcuate contact face. The first end of the first link includes a pin hole configured to receive the locking pin that is configured to be removably engaged to the hook portion. A second link includes a first end, an opposing second end, and a second arcuate contact face. The first end of the second link is pivotally coupled to the main body portion via the first pivot pin. The adaptor tool also includes at least a third link having a first end, an opposing second end, and a third arcuate contact face. The first, second, and at least a third links are pivotally coupled end-to-end such that the first arcuate contact face, second arcuate contact face, and third arcuate contact face define a circular opening having a center axis. The circular opening is configured to receive the threaded workpiece such that a rotational force applied to the main body portion facilitates rotation of the adaptor tool and the threaded workpiece about the center axis.

In another aspect, a system for engaging a threaded workpiece is provided. The system comprises a torque tool and an adaptor tool used in combination with the torque tool. The adaptor tool comprises a locking pin and a main body portion defining a hook portion and an aperture. The main body portion is configured to pivot about a first pivot pin, and the aperture is configured to receive a torque tool. The adaptor tool further includes a first link having a first end, an opposing second end, and a first arcuate contact face. The first end of the first link includes a pin hole configured to receive the locking pin that is configured to be removably engaged to the hook portion. A second link includes a first end, an opposing second end, and a second arcuate contact face. The first end of the second link is pivotally coupled to the main body portion via the first pivot pin. The adaptor tool also includes at least a third link having a first end, an opposing second end, and a third arcuate contact face. The first, second, and at least a third links are pivotally coupled end-to-end such that the first arcuate contact face, second arcuate contact face, and third arcuate contact face define a circular opening having a center axis. The circular opening is configured to receive the threaded workpiece such that a rotational force applied to the main body portion facilitates rotation of the adaptor tool and the threaded workpiece about the center axis.

In yet another aspect, a method of engaging a threaded workpiece is provided. An adaptor tool is provided that comprises a locking pin and a main body portion defining a hook portion and an aperture, wherein the main body portion is configured to pivot about a pivot pin. The adaptor tool includes a first link having a first end, an opposing second end, and a first arcuate contact face, wherein the first end includes a pin hole configured to receive the locking pin. A second link includes a first end, an opposing second end, and a second arcuate contact face, wherein the second link first end is pivotally coupled to the main body portion via the pivot pin. The adaptor tool further includes at least a third link having a first end, an opposing second end, and a third arcuate contact face, wherein the first, second and at least third links are pivotally coupled end-to-end. The method comprises encircling the first, second, and at least third links around the threaded workpiece such that the first, second, and third arcuate contact face define a circular opening which contains the threaded workpiece. The locking pin is then removably coupled to the hook portion of the main body portion such that the first, second, and at least third links lock around the threaded workpiece. A torque tool is inserted into the aperture of the main body portion and a moment force is applied to the main body portion to constrict the opening and bring the first, second, and third arcuate contact faces into a friction fit with the workpiece. The method also comprises changing the angle of engagement between the hook portion and the locking pin during the application of the moment force to rotate the adaptor tool about a center axis of the opening to facilitate tightening or loosening the threaded workpiece.

DETAILED DESCRIPTION

Figure 1:
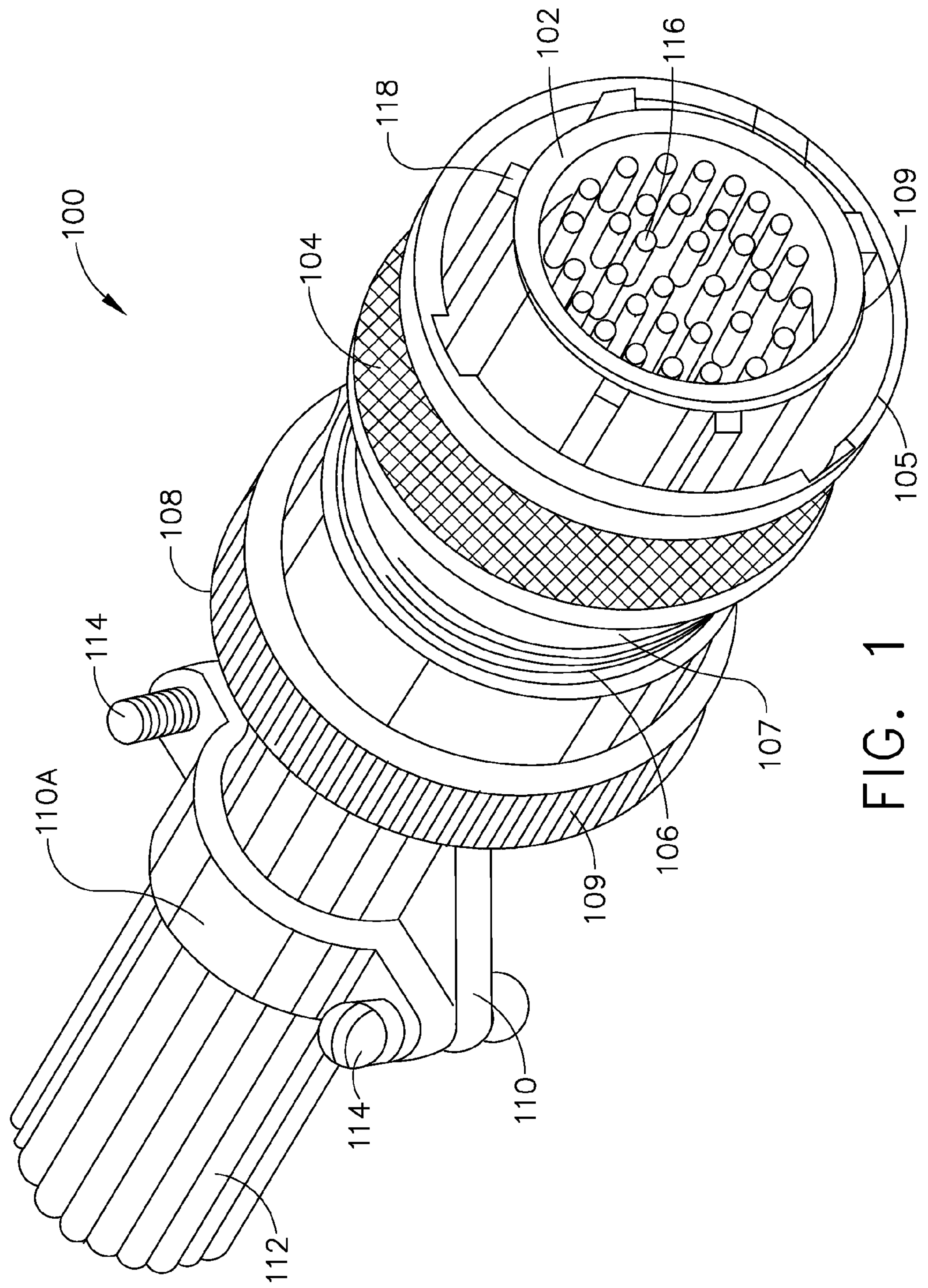
FIG. 1 is a perspective view of an electrical connector with which the exemplary torque wrench adaptor tool may be used.

FIG. 1 is a perspective view of an electrical connector 100 with which the exemplary torque wrench adaptor tool 200 (not shown in FIG. 1) may be used. FIG. 1 illustrates a typical mil spec type multi-pin connector 100 having an outer metal housing 102 and a rotatable locking ring 104. A rear portion 107 of housing 102 includes a plurality of threads 106 for receiving an internally threaded backshell 108. Backshell 108 may include a knurled outer surface 109 to facilitate rotation about threads 106. Backshell 108 may further include a strain relief 110, at least a portion of which may be formed integrally with backshell 108. Strain relief 110 may include a clamp portion 110A adapted for clamping a plurality of wires 112 by means of at least one threaded fastener 114. Each of wires 112 connects to a respective one of a plurality of pins 116 located in a front portion 105 of connector housing 102. An outer circumference 109 of front portion 105 of housing 102 includes a plurality of raised areas 118 which act as keys for precisely aligning connector 100 with a mating connector (not shown) so that pins 116 are inserted into corresponding holes (not shown) of the mating connector. Raised areas or keys 118 are configured to provide a means for fixedly holding housing 102 to enable backshell 108 to be tightened onto connector 100 to a specified torque. Backshells are manufactured in a variety of standard sizes to accommodate the size of the connector based on the amount of wires configured to be coupled therethrough.

Figure 2:
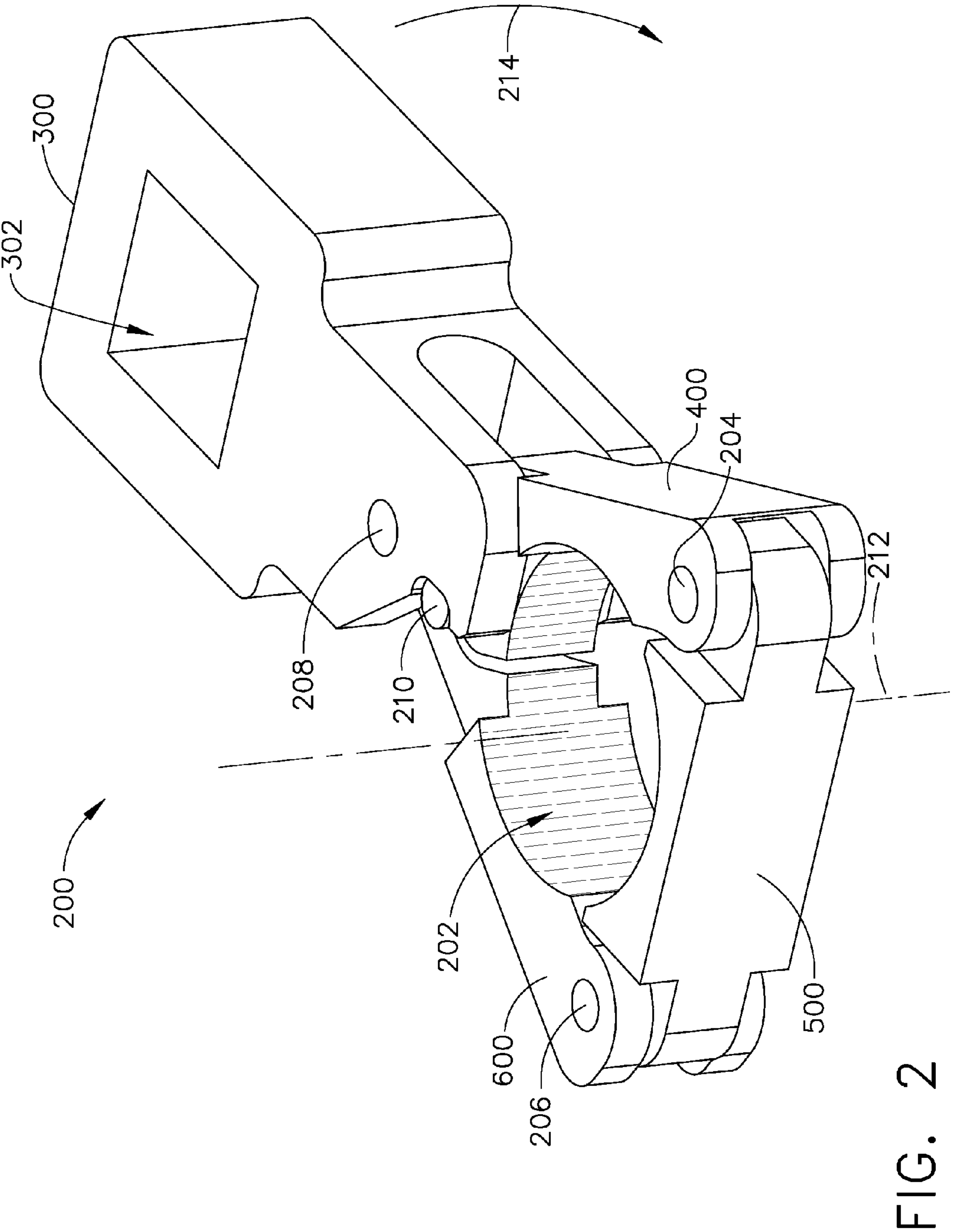
FIG. 2 is a perspective view of the exemplary embodiment of a torque wrench adaptor tool.

FIG. 2 is a perspective view of the exemplary embodiment of torque wrench adaptor tool 200. Tool 200 is configured to facilitate tightening of a threaded workpiece, such as backshell 108 (shown in FIG. 1) on electrical connector 100 (shown in FIG. 1), to a specific torque setting requirement. In the exemplary embodiment, tool 200 includes a main body 300 and at least three links: a locking link 400, a connecting link 500, and a receiving link 600. Alternatively, tool 200 may include more than three links. Tool 200 may include as many links as required to operate as described herein. Locking link 400, connecting link 500, and receiving link 600 are pivotally coupled end-to-end and configured to form a triangular shape having an opening 202 at its center. Opening 202 is shaped and sized to receive backshell 108 and includes axis 212.

In the exemplary embodiment, main body 300 includes a hook portion 318 (not shown in FIG. 2) shaped to receive a locking pin 210 extended through a pin hole 412 (not shown in FIG. 2) of locking link 400. Locking link 400 and connecting link 500 are coupled together by a first pivot pin 204; connecting link 500 and receiving link 600 are coupled together by a second pivot pin 206; and receiving link 600 and main body 300 are coupled together by a third pivot pin 208. Main body 300 further includes an aperture 302 to receive a torque wrench (not shown) that may be used to apply a moment force on main body 300 such that tool 200, and specifically links 400, 500, and 600 via opening 202, grips around backshell 108 to facilitate tightening of backshell 108.

Figure 3B:
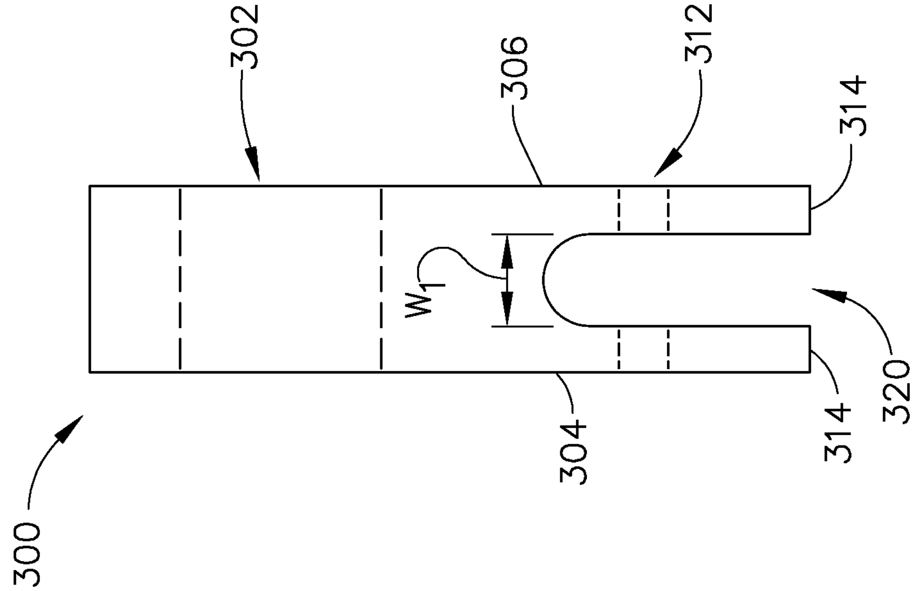
FIG. 3B is a side view of the main body shown in FIG. 3A.
Figure 3A:
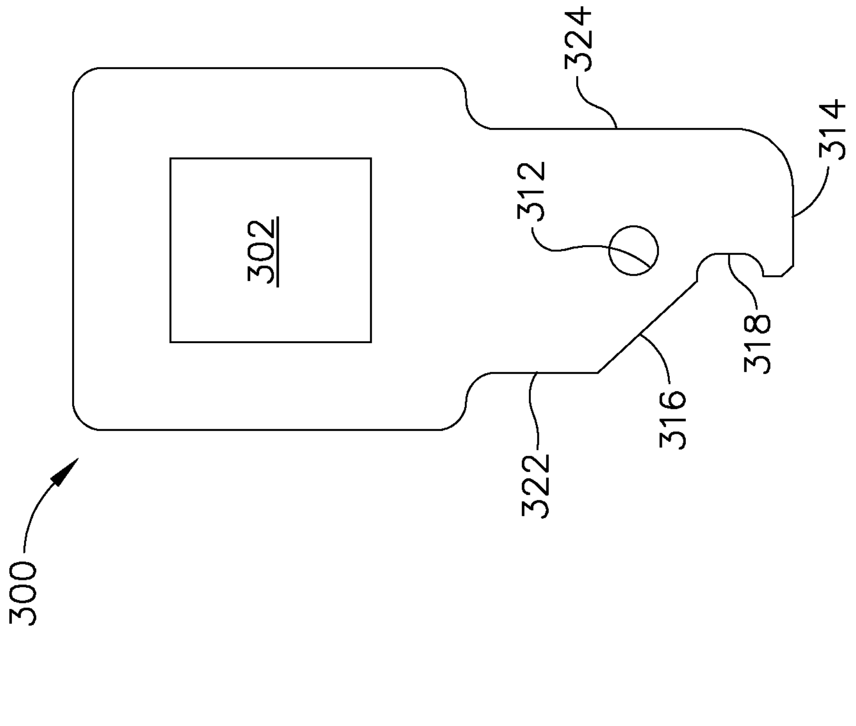
FIG. 3A is a top view of a main body used in the exemplary torque wrench adaptor tool shown in FIG. 2.

FIG. 3A is a top view of main body 300 and FIG. 3B is a side view of main body 300 used in the exemplary torque wrench adaptor tool 200 (shown in FIG. 2). In the exemplary embodiment, main body 300 is polygonal in shape and includes aperture 302 comprising a substantial portion of main body 300 and configured to accept a torque wrench (not shown) that may be used to operate tool 200. Main body 300 further includes a first arm 304 and a parallel second arm 306. In the exemplary embodiment, arms 304 and 306 extend from the same side of main body 300 and are spaced apart a width $W_1$ such that a cavity 320 is defined therebetween. Cavity 320 is configured to receive at least a portion of both locking link 400 and receiving link 600 such that arms 304 and 306 restrict axial movement of links 400 and 600. Arms 304 and 306 are identical such that each includes: an end 314 opposite main body 300, a hook portion 318 proximate to end 314, opposing edges 322 and 324, and a guide face 316 extending diagonally between hook portion 318 and edge 322 of each arm 304 and 306. In the exemplary embodiment, hook portion 318 is shaped to receive locking pin 210 (shown in FIG. 2) that is extended through pin hole 412 (not shown in FIG. 3) of locking link 400 (shown in FIG. 2). Guide face 316 is configured to direct locking pin 210 into hook portion 318 as described in further detail below. Arm 304 also includes pin hole 312 concentric with a corresponding pin hole 312 of arm 306. Pin hole 312 is configured to receive pivot pin 208 (shown in FIG. 2).

Figure 4B:
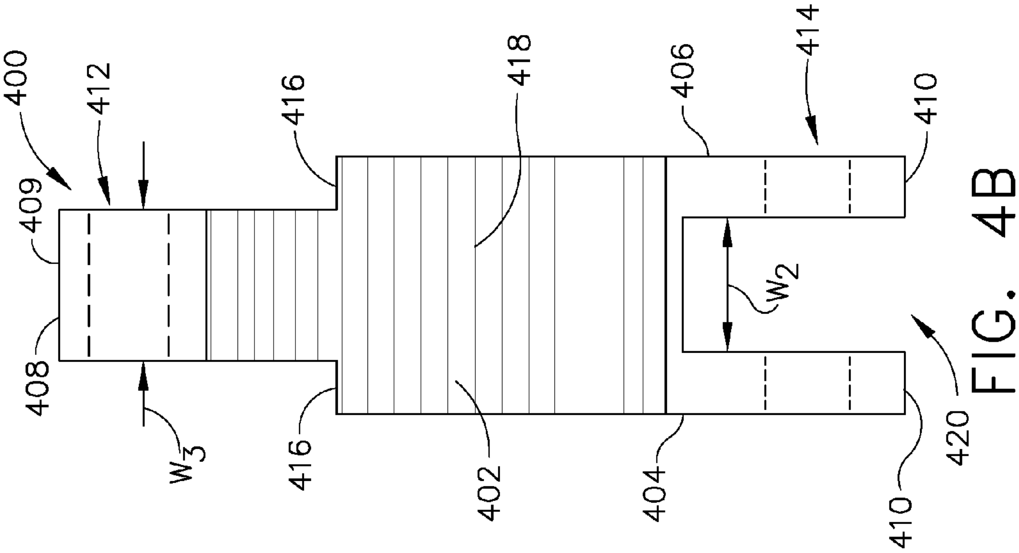
FIG. 4B is a side view of the locking link shown in FIG. 4A.
Figure 4A:
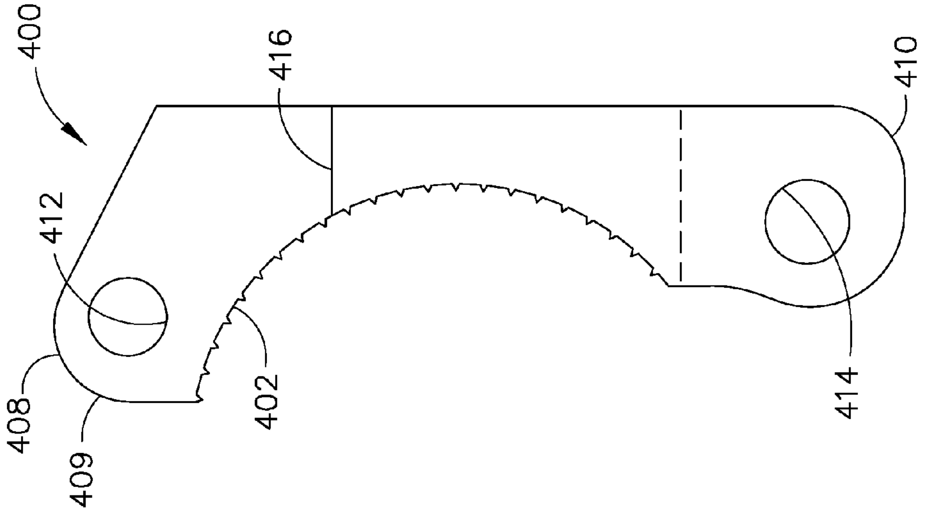
FIG. 4A is a top view of a locking link used in the exemplary torque wrench adaptor tool shown in FIG. 2.

FIG. 4A is a top view of locking link 400 and FIG. 4B is a side view of locking link 400 used in the exemplary torque wrench adaptor tool 200 (shown in FIG. 2). In the exemplary embodiment, locking link 400 includes a first end 408, a second end 410, and an arcuate contact face 402 extending therebetween. First end 408 has a width of $W_3$ and includes end face 409 and pin hole 412 configured to receive locking pin 210 (shown in FIG. 2). Width $W_3$ of first end 408 is less than width $W_1$ between arms 304 and 306 of main body 300 (all shown in FIG. 3) such that at least a portion of first end 408 is configured to fit within a portion of cavity 320 between arms 304 and 306 when locking pin 210 is engaged with hook portion 318 (shown in FIG. 3). Contact face 402 comprises at least a portion of opening 202 (shown in FIG. 2) and may include a knurled surface 418 that facilitates to reduce slippage of tool 200 about backshell 108 (shown in FIG. 1). Locking link 400 further includes a first arm 404 and a parallel second arm 406. In the exemplary embodiment, arms 404 and 406 comprise second end 410 and are spaced apart a width $W_2$ such that a cavity 420 is defined therebetween. Cavity 420 is configured to receive at least a portion of connecting link 500 (shown in FIG. 2). Arm 404 also includes pin hole 414 concentric with a corresponding pin hole 414 of arm 406. Pin hole 414 is configured to receive pivot pin 204 (shown in FIG. 2). Locking link 400 also includes a limiting face 416 proximate to ends 314 of arms 304 and 306 of main body 300. Limiting face 416 is configured to limit the circumferential movement of main body 300 about pivot pin 208 as described in further detail below.

Figure 5B:
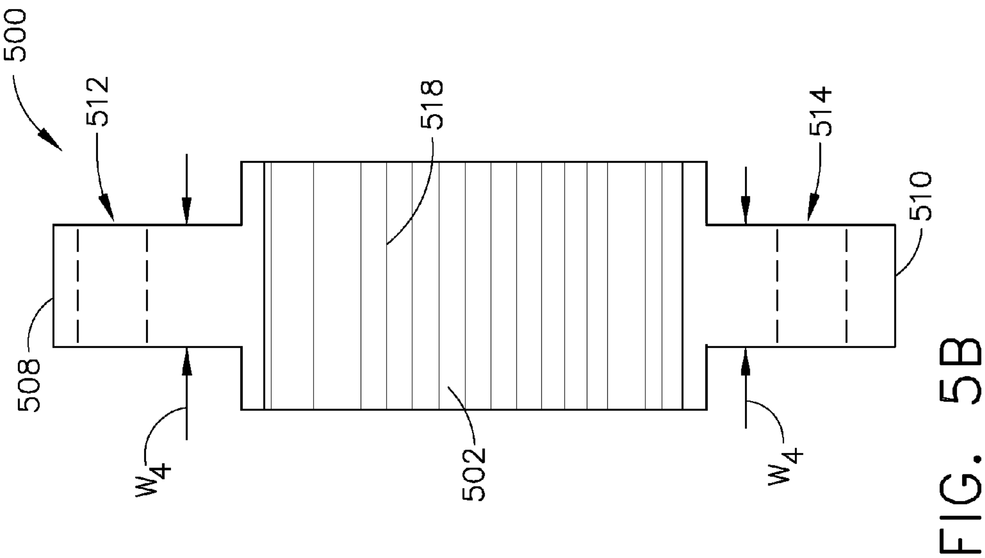
FIG. 5B is a side view of the connecting link shown in FIG. 5A.
Figure 5A:
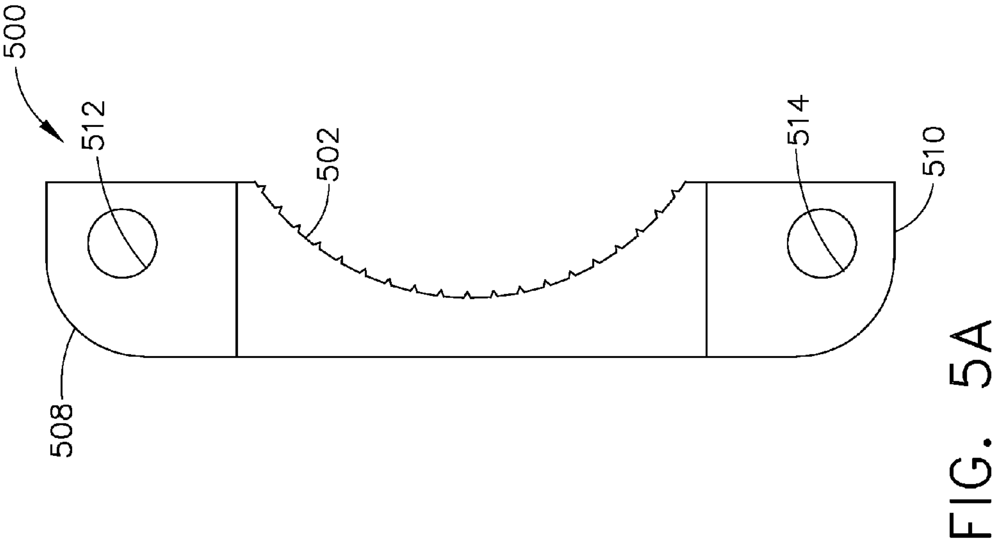
FIG. 5A is a top view of a connecting link used in the exemplary torque wrench adaptor tool shown in FIG. 2.

FIG. 5A is a top view of connecting link 500 and FIG. 5B is a side view of connecting link 500 used in the exemplary torque wrench adaptor tool 200 (shown in FIG. 2). In the exemplary embodiment, connecting link 500 includes a first end 508, a second end 510, and an arcuate contact face 502 extending therebetween. First end 508 has a width $W_4$ and includes pin hole 512 configured to receive pivot pin 206 (shown in FIG. 2). Contact face 502 comprises at least a portion of opening 202 (shown in FIG. 2) and may include a knurled surface 518 that facilitates to reduce slippage of tool 200 about backshell 108 (shown in FIG. 1). Second end 510 also has a width $W_4$ and includes pin hole 514 configured to receive pivot pin 204 (shown in FIG. 2). Width $W_4$ of second end 510 is less than width $W_2$ between arms 404 and 406 of locking link 400 (all shown in FIG. 4) such that at least a portion of second end 510 is configured to fit within a portion of cavity 420 between arms 404 and 406. Pin holes 514 and 414 are concentric to receive pivot pin 204 such that connecting link 500 and locking link 400 are pivotally coupled to one another.

Figure 6B:
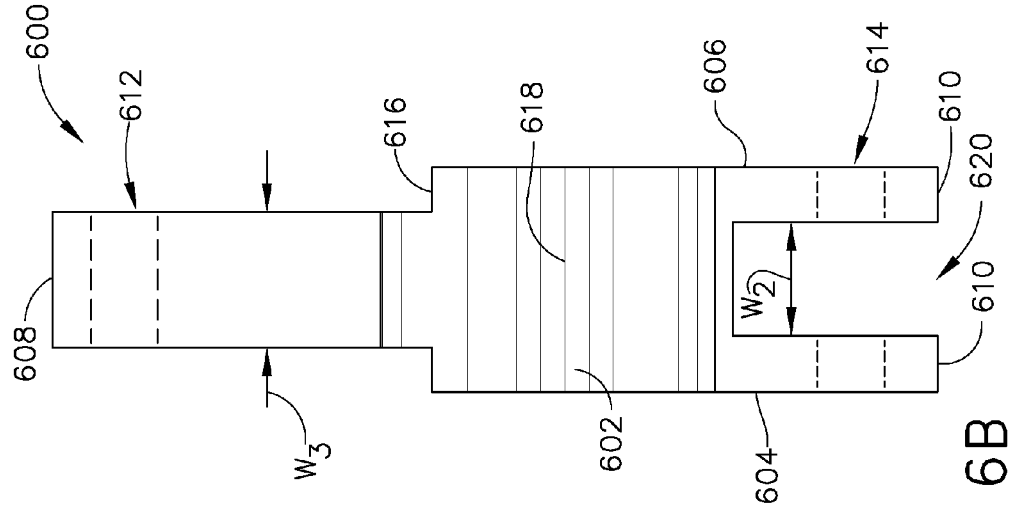
FIG. 6B is a side view of the receiving link shown in FIG. 6A.
Figure 6A:
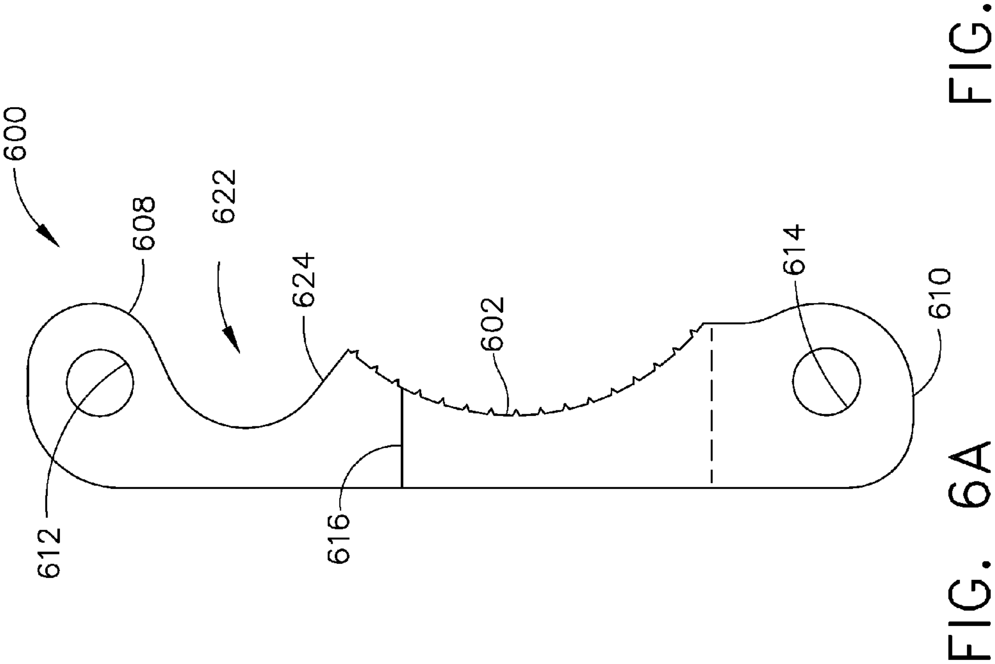
FIG. 6A is a top view of a receiving link used in the exemplary torque wrench adaptor tool shown in FIG. 2.

FIG. 6A is a top view of receiving link 600 and FIG. 6B is a side view of receiving link 600 used in the exemplary torque wrench adaptor tool 200 (shown in FIG. 2). In the exemplary embodiment, receiving link 600 includes a first end 608, a second end 610, a receiving pocket 622 proximate to first end 608, and an arcuate contact face 602 proximate to second end 610. Receiving link 600 includes a first arm 604 and a parallel second arm 606. In the exemplary embodiment, arms 604 and 606 comprise second end 610 and are spaced apart a width $W_2$ such that a cavity 620 is defined therebetween. Arm 604 includes a pin hole 614 concentric with a corresponding pin hole 614 of arm 606. Pin hole 614 is configured to receive pivot pin 206 (shown in FIG. 2). In the exemplary embodiment, cavity 620 is configured to receive at least a portion of first end 508 of connecting link 500 (both shown in FIG. 5). Width $W_2$ of cavity 620 between arms 604 and 606 of receiving link 600 is slightly greater than width $W_4$ of first end 508 such that at least a portion of first end 508 is configured to fit within a portion of cavity 620. Pin holes 614 and 512 are concentric to receive pivot pin 206 such that receiving link 600 and connecting link 500 are pivotally coupled to one another.

In the exemplary embodiment, first end 608 of receiving link 600 has a width $W_3$ and includes pin hole 612 configured to receive pivot pin 208 (shown in FIG. 2). Width $W_3$ of first end 608 is less than width $W_1$ between arms 304 and 306 of main body 300 (all shown in FIG. 3) such that at least a portion of first end 608 is configured to fit within a portion of cavity 320 between arms 304 and 306. Pin holes 612 and 312 are concentric to receive pivot pin 208 such that receiving link 600 and main body 300 are pivotally coupled to one another. Contact face 602 comprises at least a portion of opening 202 (shown in FIG. 2) and may include a knurled surface 618 that facilitates to reduce slippage of tool 200 about backshell 108 (shown in FIG. 1). In the exemplary embodiment, when locking pin 210 (shown in FIG. 2) is engaged with hook portion 318 of main body 300, arcuate contact faces 602, 502, and 402 combine to form circular opening 202.

In the exemplary embodiment, receiving pocket 622 of receiving link 600 includes a receiving face 624. Receiving pocket 622 is sized and shaped to receive first end 408 of locking link 400 such that end face 409 (shown in FIG. 4) is slidably and rotably coupled to receiving face 624 during operation of tool 200 as described in further detail below. Receiving link 600 further includes a limiting face 616 proximate to receiving pocket 622 and contact face 602. Limiting face 616 is configured to limit the circumferential movement of main body 300 about pivot pin 208 as described in further detail below.

In the exemplary embodiment, links 400, 500, and 600 are manufactured from a manganese bronze metallic alloy. Alternatively, links 400, 500, and 600 may be manufactured from any soft metallic alloy having a high tensile strength that enables links 400, 500, and 600 to grip backshell 108 (shown in FIG. 1). Specifically, links 400, 500, and 600 are manufactured from a soft metallic material such that knurled outer surface 109 of backshell 108 is not damaged and forms corresponding knurls 418, 518, and 618 on contact faces 402, 502, and 602. Alternatively, links 400, 500, and 600 may be manufactured to include knurls 418, 518, and 618. In the exemplary embodiment, knurled contact faces 402, 502, and 602 are in intimate contact with knurling 109 of backshell 108 to facilitate a tight grip and eliminate slippage of tool 200 about backshell 108.

Figure 7B:
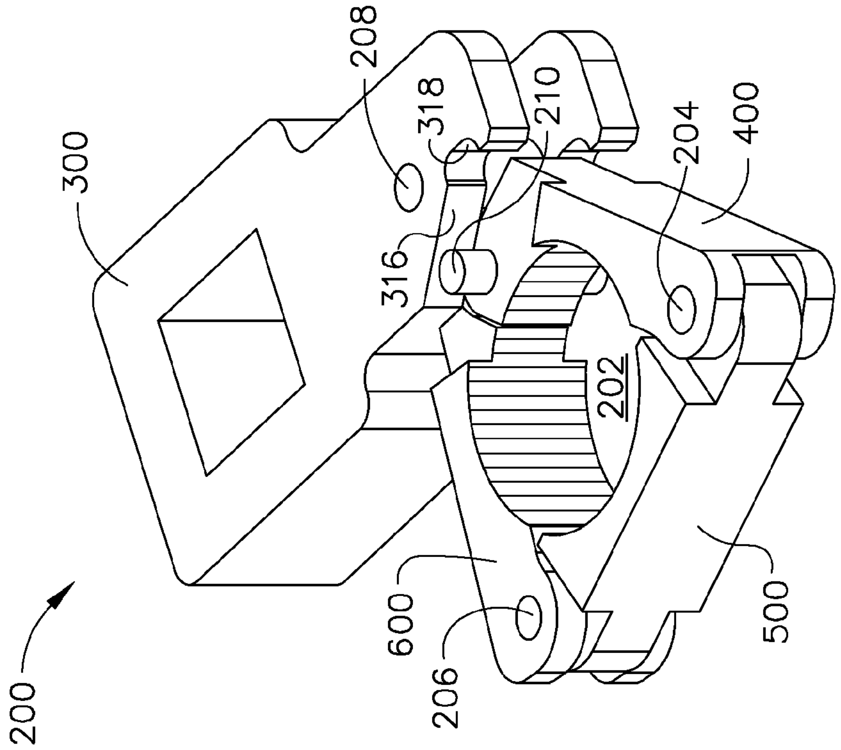
FIG. 7A-C are perspective views of the exemplary torque wrench adaptor tool during operation.
Figure 7A:
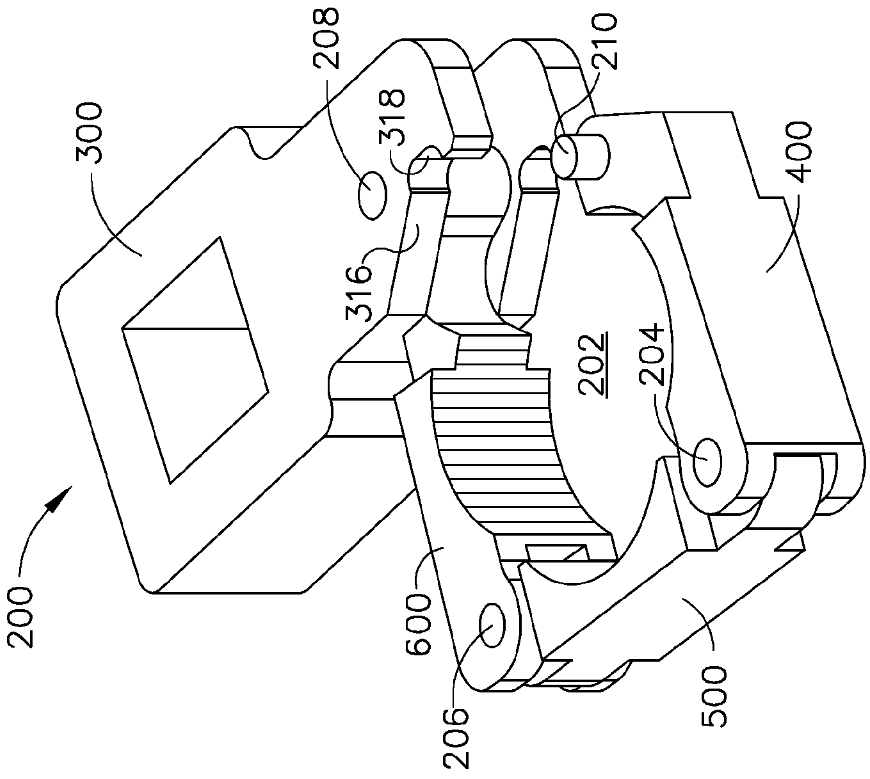
Figure 7C:
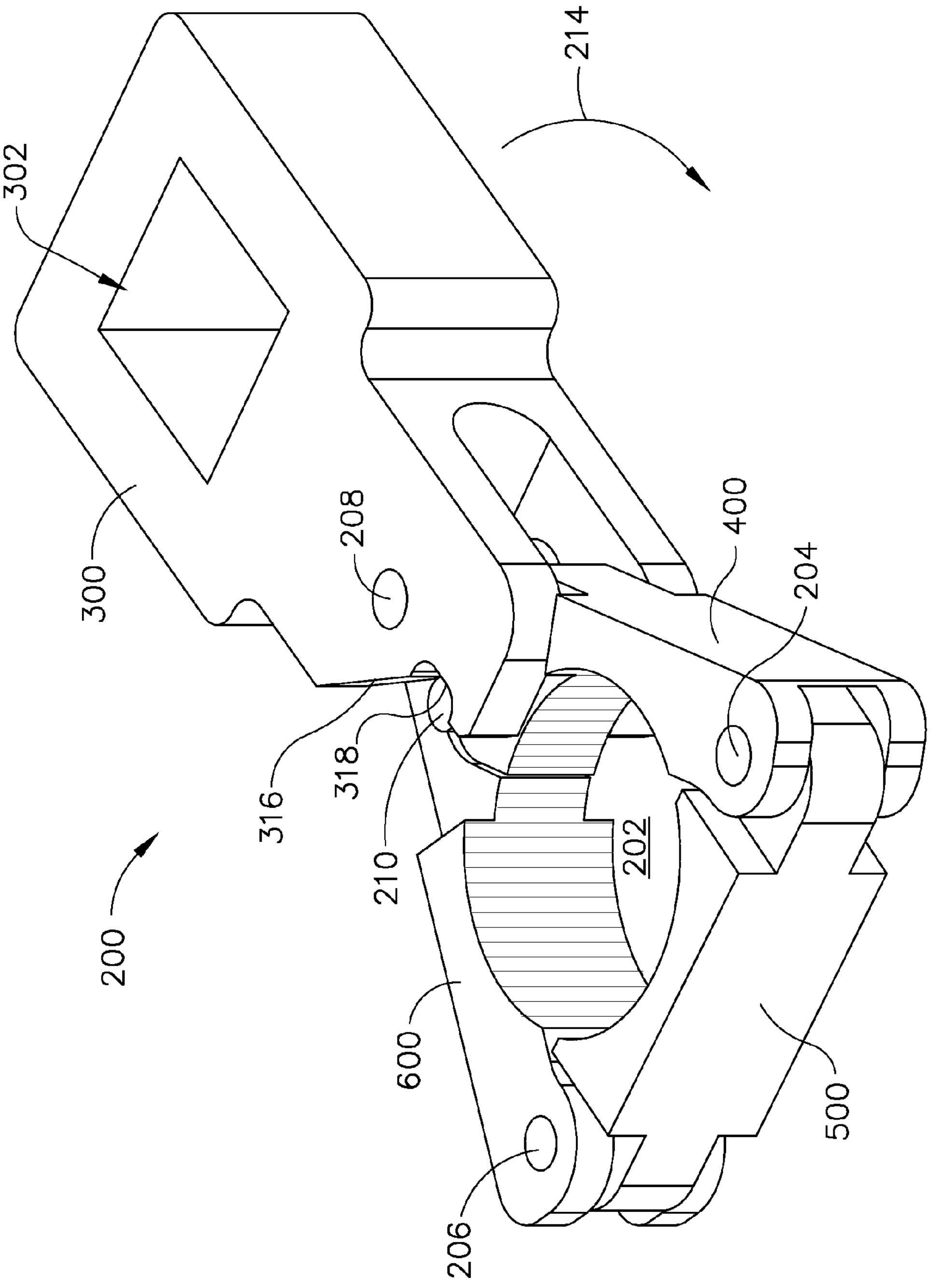

FIG. 7A-C are perspective views of the exemplary torque wrench adaptor tool 200 in operation. FIG. 7A illustrates tool 200 in a disengaged position where locking pin 210 is disengaged from hook portion 318. Locking pin 210 extends through pin hole 412 (shown in FIG. 4) and protrudes beyond the opposing exterior surfaces of locking link 400. During operation of the exemplary embodiment, locking pin 210 is removable from hook portion 318 such that locking link 400 may be disengaged from main body 300, and removable from cavity 320 (shown in FIG. 3). In such a disengaged position, links 400, 500, and 600 pivot about pivot pins 204, 206, and 208, respectively such that tool 200 is able to accept backshell 108 (shown in FIG. 1) into opening 202. When locking link 400 is disengaged from main body 300, opening 202 widens such that it may no longer be circular in shape, but is able to receive backshell 108.

FIG. 7B illustrates tool 200 in a partially engaged position where links 400, 500, and 600 pivot about pivot pins 204, 206, and 208, respectively, to enclose around backshell 108 (shown in FIG. 1). In the exemplary embodiment, links 400, 500, and 600, encircle backshell 108 such that opening 202 encircles backshell 108. In such a partially engaged position, receiving pocket 622 (shown in FIG. 6) at least partially receives a portion of first end 408 (shown in FIG. 4) of locking link 400 and cavity 320 (shown in FIG. 3) also at least partially receives a portion of first end 408. When tool 200 is completely closed (shown in FIG. 7C), end face 409 (shown in FIG. 4) is slidably coupled to receiving face 624 (shown in FIG. 6) of receiving pocket 622 and first end 408 is at least partially contained within cavity 320. As described above, because backshells are manufactured in a variety of standard sizes, each size backshell requires a corresponding sized adaptor tool 200. However, each manufacturer of backshells may have slightly different specifications, so backshells manufactured to the same standard size may vary slightly in actual size. In the exemplary embodiment, tool 200 accounts for these variations by using guide face 316 to guide locking pin 210 into hook portion 318 even when tool 200 is not completely closed, for example, when a gap (not shown) is defined between first end 408 and receiving face 624. Guide face 316 directs locking pin 210 to engage hook portion 318. In the exemplary embodiment, tool 200 is operable for each backshell when hook portion 318 is able to engage locking pin 210. Links 400, 500, and 600 may be scaled up or scaled down to correspond to the different standard sizes of backshells. Alternatively, tool 200 may use more than three links for larger backshells, that is, tool 200 may include a second connecting link (not shown) between locking link 400 and connecting link 500 or between connecting link 500 and receiving link 600.

FIG. 7C illustrates tool 200 in a fully engaged position where main body 300 pivots about pivot pin 208 (shown in FIG. 1) such that hook portion 318 engages locking pin 210 and links 400, 500, and 600 are closed around backshell 108 (shown in FIG. 1). As described above, guide face 316 guides locking pin 210 into hook portion 318 such that main body 300 may be rotated about pin 208 to lock tool 200 in place around backshell 108. In the completely closed position, end face 409 (shown in FIG. 4) of locking link 400 is slidably coupled to receiving face 624 of receiving pocket 622 (both shown in FIG. 6) and first end 408 (shown in FIG. 4) is at least partially contained within cavity 320 (shown in FIG. 3). In the exemplary embodiment, once locking pin 210 engages hook portion 318, a torque wrench (not shown) is inserted into aperture 302, and a moment force is applied in the direction of arrow 214 to rotate main body 300 about pivot pin 208. The force applied to tool 200 through main body 300 by the torque wrench causes links 400, 500, and 600 to compress opening 202 to bring contact faces 418, 518, and 618 into a friction fit with backshell 108. The more rotational force applied to main body 300, the further main body 300 rotates, and the tighter links 400, 500, and 600 grip backshell 108. As described above, knurled surface 109 (shown in FIG. 1) forms corresponding knurls 418, 518, and 618 in contact faces 402, 502, and 602 (all shown in FIGS. 4-6) to limit slippage of tool 200 about backshell 108. When links 400, 500, and 600 are tightened around backshell 108, additional moment force is applied that changes the angle of engagement between hook portion 318 and locking pin 210 such that tool 200 rotates about centerline 212 to facilitate tightening backshell 108 onto connector 10.

Rotation of main body 300 is limited in direction 214 by limiting faces 416 (shown in FIG. 4) such that maximum force is applied when edge 324 of arms 304 and 306 (all shown in FIG. 3) contact limiting faces 416. Limiting the rotation of main body 300 prevents damaging tool 200 by using an excessive amount of force. In the exemplary embodiment, links 400, 500, and 600 of tool 200 surround backshell 108 such that when force is applied to tool 200, the force is evenly distributed about the circumference of backshell 108. Even distribution of force prevents backshell 108 from damage by eliminating a focused point load. In the exemplary embodiment, once tool 200 is tightened about backshell 108, the torque wrench is used to rotate tool 200 about axis 212 (shown in FIG. 2) to tighten backshell 108 onto connector 100 (shown in FIG. 1) until a desired torque setting is achieved. Main body may be rotated opposite direction 214 to disengage locking pin 210 from hook portion 318 and remove tool 200 from backshell 108.

In the exemplary embodiment, tool 200 may be flipped such that hook portion 318 faces direction 214 to loosen backshell 108 to disassemble or loosen connector 100. Main body 300 may then be rotated about pivot pin 208 opposite direction 214 to tighten links 400, 500, and 600 around backshell 108 and tool 200 rotated opposite direction 214 to loosen backshell 108 from connector 100. As in tightening of backshell 108, rotation of main body 300 is limited during loosening. Limiting faces 616 (shown in FIG. 6) of receiving link 600 limit the rotation of main body 300 in a direction opposite direction 214 such that maximum force is applied when edge 322 or guide face 316 of arms 304 and 306 (all shown in FIG. 3) contact limiting faces 616. Limiting the rotation of main body 300 limits the moment force applied and therefore prevents damaging tool 200.

Figure 8:
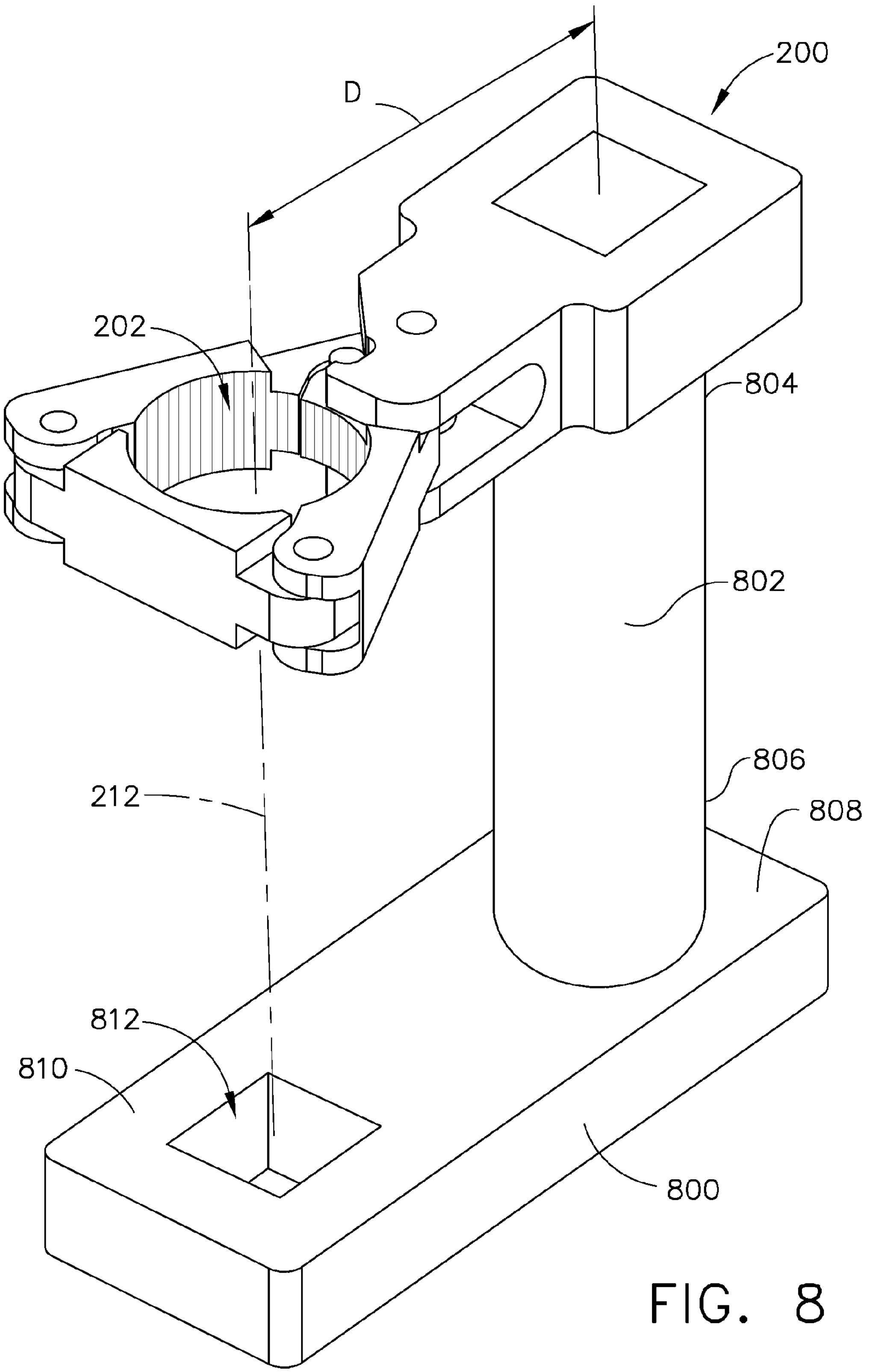
FIG. 8 is a perspective view of the exemplary torque wrench adaptor tool in an alternative method of operation.

FIG. 8 is a perspective view of the exemplary torque wrench adaptor tool 200 in an alternative method of operation. In the exemplary embodiment, tool 200 may be used in combination with an extension device 802 and an offset device 800. Extension device 802 is a cylindrical bar including a first end 804 and a second end 806, wherein each end 804 and 806 includes a square peg. Offset device 800 is a rectangular bar having a first end 808 and a second end 810. First end 808 includes a first aperture (not shown) and second end 810 includes a second aperture 812. The center of the first aperture is a distance D from the center of second aperture 812 where D is an offset distance. Offset distance D is defined as the distance between the center of opening 202, centerline 212, and the point at which torque is applied to tool 200, the center of aperture 302. Extension device 802 may be of any length such that tool 200 is operable as described herein. First end 804 of extension device 802 is configured to be inserted into aperture 302 of main body 300 and second end 806 of extension device 802 is configured to be inserted into the first aperture of first end 808 of offset device 800. Second aperture 812 in second end 810 of offset device 800 is coaxial, with respect to centerline 212, with opening 202 and is configured to receive a torque wrench (not shown).

Offset device 800 facilitates obtaining an accurate torque reading by positioning force applied by the torque wrench along centerline 212. Desired torque settings are measured from centerline 212, so applying the force at aperture 302 defines offset distance D that requires the use of correction tables that take distance D into account to obtain the true torque reading. Extension device 802 and offset device 800 positions the torque wrench along the same axis, centerline 212, to obtain a true torque reading without requiring a correction factor.

The torque wrench adaptor tool described herein presents many advantages over known methods of tightening backshells on electrical connectors. The present adaptor tool surrounds the workpiece to evenly distribute the force applied about the circumference of the workpiece. The even distribution of force prevents damage to the workpiece that may occur when the force is concentrated. Furthermore, the links comprising the present tool are manufactured from a soft metallic material, such as manganese bronze, such that the knurls machined into many workpieces form corresponding knurls in the tool to prevent slippage of the tool during use. The locking pin and hook portion combination of the present adaptor tool accounts for slight size variations in the workpiece due to different manufacturers' varying specifications. Moreover, the present adaptor tool is configured to be easily operable by a single person. The above described links are simply wrapped around the workpiece to engage the locking pin with the hook portion and the workpiece may be tightened by using a torque wrench to rotate the tool about the workpiece. No other tools are necessary to operate the adaptor tool. If desired, an extension device and offset device may be used to obtain accurate torque readings from the wrench without requiring a correction factor to account for any offset distance.

Exemplary embodiments of a torque wrench adaptor tool assembly and methods of operating the tool are described above in detail. The adaptor tool and methods of operating the tool are not limited to the specific embodiments described herein, but rather, components of the assembly and/or steps of the methods may be utilized independently and separately from other components and/or steps described herein. For example, the methods may also be used in combination with other threaded workpieces requiring assembly, and are not limited to practice with only the electrical connector backshell workpieces as described herein. Rather, the exemplary embodiment can be implemented and utilized in connection with many other wrenching applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An adaptor tool for engaging a threaded workpiece, said adaptor tool comprising:

a locking pin;

a main body portion defining a hook portion and an aperture, said main body portion configured to pivot about a first pivot pin, said aperture configured to receive a torque tool, said main body portion further including a first arm spaced a distance from a second arm to define a cavity configured to receive at least a portion of said first link and at least a portion of said second link;

a first link having a first end, an opposing second end, and a first arcuate contact face, wherein said first end includes a pin hole configured to receive said locking pin, said locking pin configured to be removably engaged to said hook portion;

a second link having a first end, an opposing second end, and a second arcuate contact face; wherein said second link first end is pivotally coupled to said main body portion via said first pivot pin; and at least a third link having a first end, an opposing second end, and a third arcuate contact face, wherein said first link, said second link, and said at least a third link are pivotally coupled end-to-end such that said first arcuate contact face, said second arcuate contact face, and said third arcuate contact face define a circular opening having a center axis, wherein said circular opening is configured to receive the threaded workpiece such that a rotational force applied to said main body portion facilitates rotation of said adaptor tool and the threaded workpiece about said center axis.

2. The adaptor tool of claim 1, wherein said first link second end is pivotally coupled to said third link second end via a second pivot pin and said second link second end is coupled to said third link first end via a third pivot pin.

3. The adaptor tool of claim 1, wherein said main body portion further includes a guide surface configured to facilitate engaging said locking pin with said hook portion.

4. The adaptor tool of claim 1, wherein said first link further includes opposing exterior surfaces, wherein said locking pin protrudes beyond said opposing exterior surfaces.

5. An adaptor tool for engaging a threaded workpiece, said adaptor tool comprising:

a locking pin;

a main body portion defining a hook portion and an aperture, said main body portion configured to pivot about a first pivot pin, said aperture configured to receive a torque tool;

a first link having a first end, an opposing second end, and a first arcuate contact face, wherein said first end includes a pin hole configured to receive said locking pin, said locking pin configured to be removably engaged to said hook portion;

a second link having a first end, an opposing second end, and a second arcuate contact face; wherein said second link first end is pivotally coupled to said main body portion via said first pivot pin; and at least a third link having a first end, an opposing second end, and a third arcuate contact face, wherein said first link, said second link, and said at least a third link are pivotally coupled end-to-end such that said first arcuate contact face, said second arcuate contact face, and said third arcuate contact face define a circular opening having a center axis, wherein said circular opening is configured to receive the threaded workpiece such that a rotational force applied to said main body portion facilitates rotation of said adaptor tool and the threaded workpiece about said center axis;

wherein said first link, said second link, and said at least a third link are manufactured from a soft metallic material such that each of said first, second, and third contact faces deform to correspond to a plurality of knurls formed in the threaded workpiece to prevent slippage of said adaptor tool about the threaded workpiece.

6. The adaptor tool of claim 1, wherein said second link further includes a receiving pocket configured to accept at least a portion of said first link when said hook portion engages said locking pin.

7. A system for engaging a threaded workpiece, said system comprising:

a torque tool;

an adaptor tool used in combination with said torque tool, said adaptor tool comprising:

a locking pin;

a main body portion defining a hook portion and an aperture, said main body portion configured to pivot about a first pivot pin, said aperture configured to receive the torque tool, said main body portion further including a first arm spaced a distance from a second arm to define a cavity configured to receive at least a portion of said first link and at least a portion of said second link;

a first link having a first end, an opposing second end, and a first arcuate contact face, wherein said first end includes a pin hole configured to receive said locking pin, said locking pin configured to be removably engaged to said hook portion;

a second link having a first end, an opposing second end, and a second arcuate contact face; wherein said second link first end is pivotally coupled to said main body portion via said first pivot pin; and at least a third link having a first end, an opposing second end, and a third arcuate contact face, wherein said first link, said second link, and said at least a third link are pivotally coupled end-to-end such that said first arcuate contact face, said second arcuate contact face, and said third arcuate contact face define a circular opening having a center axis, wherein said circular opening is configured to receive the threaded workpiece such that a rotational force applied to said main body portion facilitates rotation of said adaptor tool and the threaded workpiece about said center axis.

8. The system of claim 7, wherein said first link second end is pivotally coupled to said third link second end via a second pivot pin and said second link second end is coupled to said third link first end via a third pivot pin.

9. The system of claim 7, wherein said main body portion further includes a guide surface configured to facilitate engaging said locking pin with said hook portion.

10. The system of claim 7, wherein said second link further includes a receiving pocket configured to accept at least a portion of said first link when said hook portion engages said locking pin.

11. The system of claim 7 further comprising an extension device coupled to said main body, wherein said extension device is used in combination with an offset device having a hole that is coaxial with said center axis, said hole configured to receive said torque tool.

12. The system of claim 11 wherein said extension device and said offset device are configured such that a rotational force applied to said offset device by said torque tool facilitates rotation of said adaptor tool and the threaded workpiece about said center axis and facilitates obtaining an accurate torque reading.

13. A method of engaging a threaded workpiece, said method comprising:

providing an adaptor tool comprising:

a locking pin;

a main body portion defining a hook portion and an aperture, wherein the main body portion is configured to pivot about a pivot pin, the main body portion further includes a first arm spaced a distance from a second arm to define a cavity configured to receive at least a portion of the first link and at least a portion of the second link when the locking pin is engaged with the hook portion;

a first link having a first end, an opposing second end, and a first arcuate contact face, wherein said first end includes a pin hole configured to receive the locking pin;

a second link having a first end, an opposing second end, and a second arcuate contact face, wherein said second link first end is pivotally coupled to said main body portion via said pivot pin;

at least a third link having a first end, an opposing second end, and a third arcuate contact face, wherein said first link, said second link, and said at least a third link are pivotally coupled end-to-end;

encircling the first, second, and at least third links around the threaded workpiece such that the first arcuate contact face, second arcuate contact face, and third arcuate contact face define a circular opening which contains the threaded workpiece;

removably coupling the locking pin to the hook portion of the main body portion such that the first, second, and at least third links lock around the threaded workpiece;

inserting a torque tool into the aperture of the main body portion; and applying a moment force to the main body portion to constrict the opening and bring the first, second, and third arcuate contact faces into a friction fit with the workpiece; and changing the angle of engagement between the hook portion and the locking pin during the application of the moment force to rotate the adaptor tool about a center axis of the opening to facilitate tightening or loosening the threaded workpiece.

14. The method of claim 13 wherein encircling the first, second, and at least third links around the threaded workpiece includes inserting at least a portion of the first link into a receiving pocket of the second link.

15. The method of claim 13 further comprising directing the locking pin along a guide surface toward the hook portion.

16. The method of claim 13 wherein applying a moment force to the main body portion includes rotating the main body portion about the pivot pin.

17. The method of claim 13, wherein said first link further includes opposing exterior surfaces, wherein said locking pin protrudes beyond said opposing exterior surfaces.

* * * * *